United States Patent
Lambeth et al.

(10) Patent No.: US 11,811,669 B2
(45) Date of Patent: *Nov. 7, 2023

(54) INSPECTING OPERATIONS OF A MACHINE TO DETECT ELEPHANT FLOWS

(71) Applicant: Nicira, Inc., Palo Alto, CA (US)

(72) Inventors: W. Andrew Lambeth, San Francisco, CA (US); Amit Vasant Patil, Pune (IN); Prasad Sharad Dabak, Pune (IN); Laxmikant Vithal Gunda, San Jose, CA (US); Vasantha Kumar Dhanasekar, Pune (IN); Justin Pettit, Los Altos Hills, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,601

(22) Filed: Dec. 25, 2022

(65) Prior Publication Data
US 2023/0128660 A1     Apr. 27, 2023

Related U.S. Application Data

(63) Continuation of application No. 15/972,232, filed on May 7, 2018, now Pat. No. 11,539,630, which is a
(Continued)

(51) Int. Cl.
*H04L 47/2441* (2022.01)
*H04L 43/026* (2022.01)

(52) U.S. Cl.
CPC ........ *H04L 47/2441* (2013.01); *H04L 43/026* (2013.01)

(58) Field of Classification Search
CPC .... H04L 12/26; H04L 47/2441; H04L 43/026
(Continued)

(56) References Cited

U.S. PATENT DOCUMENTS

| 3,619,731 A | 11/1971 | Baker et al. |
| 5,224,100 A | 6/1993 | Lee et al. |

(Continued)

FOREIGN PATENT DOCUMENTS

| EP | 1154601 A1 | 11/2001 |
| JP | 2002141905 A | 5/2002 |

(Continued)

OTHER PUBLICATIONS

Anwer, Muhammad Bilal, et al., "Building A Fast, Virtualized Data Plane with Programmable Hardware," Aug. 17, 2009, 8 pages, VISA'09, ACM, Barcelona, Spain.
Casado, Martin, et al. "Ethane: Taking Control of the Enterprise," SIGCOMM'07, Aug. 27-31, 2007, 12 pages, ACM, Kyoto, Japan.
Foster, Nate, et al. "Frenetic: A Network Programming Language," ICFP '11, Sep. 19-21, 2011, 13 pages, Tokyo, Japan.
Gude, Natasha, et al., "NOX: Towards an Operating System for Networks," Acm Sigcomm Computer Communication Review, Jul. 2008, 6 pages, vol. 38, No. 3, ACM.
(Continued)

*Primary Examiner* — Tauqir Hussain
(74) *Attorney, Agent, or Firm* — ADELI LLP

(57) ABSTRACT

Some embodiments provide a system that detects whether a data flow is an elephant flow; and if so, the system treats it differently than a mouse flow. The system of some embodiments detects an elephant flow by examining, among other items, the operations of a machine. In detecting, the system identifies an initiation of a new data flow associated with the machine. The new data flow can be an outbound data flow or an inbound data flow. The system then determines, based on the amount of data being sent or received, if the data flow is an elephant flow. The system of some embodiments identifies the initiation of a new data flow by intercepting a socket call or request to transfer a file.

19 Claims, 9 Drawing Sheets

Related U.S. Application Data continuation of application No. 14/502,102, filed on Sep. 30, 2014, now Pat. No. 9,967,199.

(60) Provisional application No. 62/010,944, filed on Jun. 11, 2014, provisional application No. 61/973,255, filed on Mar. 31, 2014, provisional application No. 61/913,899, filed on Dec. 9, 2013.

(58) Field of Classification Search
USPC ........................................................ 709/224
See application file for complete search history.

(56) References Cited

U.S. PATENT DOCUMENTS

| | | | |
|---|---|---|---|
| 5,245,609 A | 9/1993 | Ofek et al. | |
| 5,265,092 A | 11/1993 | Soloway et al. | |
| 5,504,921 A | 4/1996 | Dev et al. | |
| 5,550,816 A | 8/1996 | Hardwick et al. | |
| 5,668,810 A | 9/1997 | Cannella | |
| 5,729,685 A | 3/1998 | Chatwani et al. | |
| 5,751,967 A | 5/1998 | Raab et al. | |
| 5,781,534 A | 7/1998 | Perlman et al. | |
| 6,044,142 A * | 3/2000 | Hammarstrom | H04M 3/51 |
| | | | 379/201.01 |
| 6,104,699 A | 8/2000 | Holender et al. | |
| 6,104,700 A | 8/2000 | Haddock et al. | |
| 6,141,738 A | 10/2000 | Munter et al. | |
| 6,219,699 B1 | 4/2001 | McCloghrie et al. | |
| 6,430,160 B1 | 8/2002 | Smith et al. | |
| 6,456,624 B1 | 9/2002 | Eccles et al. | |
| 6,512,745 B1 | 1/2003 | Abe et al. | |
| 6,539,432 B1 | 3/2003 | Taguchi et al. | |
| 6,658,002 B1 | 12/2003 | Ross et al. | |
| 6,680,934 B1 | 1/2004 | Cain | |
| 6,721,334 B1 | 4/2004 | Ketcham | |
| 6,785,843 B1 | 8/2004 | McRae et al. | |
| 6,941,487 B1 | 9/2005 | Balakrishnan et al. | |
| 6,963,585 B1 | 11/2005 | Pennec et al. | |
| 6,999,454 B1 | 2/2006 | Crump | |
| 7,012,919 B1 | 3/2006 | So et al. | |
| 7,042,838 B1 * | 5/2006 | Shand | H04L 45/28 |
| | | | 370/221 |
| 7,079,544 B2 | 7/2006 | Wakayama et al. | |
| 7,149,817 B2 | 12/2006 | Pettey | |
| 7,149,819 B2 | 12/2006 | Pettey | |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,283,473 B2 | 10/2007 | Arndt et al. | |
| 7,342,916 B2 | 3/2008 | Das et al. | |
| 7,362,752 B1 | 4/2008 | Kastenholz | |
| 7,370,120 B2 | 5/2008 | Kirsch et al. | |
| 7,391,771 B2 | 6/2008 | Orava et al. | |
| 7,443,796 B1 * | 10/2008 | Albert | H04L 61/25 |
| | | | 709/239 |
| 7,450,598 B2 | 11/2008 | Chen et al. | |
| 7,463,579 B2 | 12/2008 | Apuh et al. | |
| 7,478,173 B1 | 1/2009 | Delco | |
| 7,483,370 B1 | 1/2009 | Dayal et al. | |
| 7,529,897 B1 * | 5/2009 | Waldspurger | G06F 11/1435 |
| | | | 714/13 |
| 7,533,176 B2 | 5/2009 | Freimuth et al. | |
| 7,555,002 B2 | 6/2009 | Arndt et al. | |
| 7,606,260 B2 | 10/2009 | Oguchi et al. | |
| 7,627,692 B2 | 12/2009 | Pessi | |
| 7,633,955 B1 | 12/2009 | Saraiya et al. | |
| 7,634,622 B1 | 12/2009 | Musoll et al. | |
| 7,640,353 B2 | 12/2009 | Shen et al. | |
| 7,643,488 B2 | 1/2010 | Khanna et al. | |
| 7,649,851 B2 | 1/2010 | Takashige et al. | |
| 7,706,266 B2 | 4/2010 | Plamondon | |
| 7,710,874 B2 | 5/2010 | Balakrishnan et al. | |
| 7,760,735 B1 | 7/2010 | Chen et al. | |
| 7,764,599 B2 | 7/2010 | Doi et al. | |
| 7,792,987 B1 | 9/2010 | Vohra et al. | |
| 7,802,000 B1 | 9/2010 | Huang et al. | |
| 7,808,919 B2 | 10/2010 | Nadeau et al. | |
| 7,808,929 B2 | 10/2010 | Wong et al. | |
| 7,818,452 B2 | 10/2010 | Matthews et al. | |
| 7,826,482 B1 | 11/2010 | Minei et al. | |
| 7,839,847 B2 | 11/2010 | Nadeau et al. | |
| 7,885,276 B1 | 2/2011 | Lin | |
| 7,936,770 B1 | 5/2011 | Frattura et al. | |
| 7,937,438 B1 | 5/2011 | Miller et al. | |
| 7,937,492 B1 | 5/2011 | Kompella et al. | |
| 7,940,763 B1 | 5/2011 | Kastenholz | |
| 7,948,986 B1 | 5/2011 | Ghosh et al. | |
| 7,953,865 B1 | 5/2011 | Miller et al. | |
| 7,991,859 B1 | 8/2011 | Miller et al. | |
| 7,995,483 B1 | 8/2011 | Bayar et al. | |
| 8,004,900 B2 | 8/2011 | Dutta et al. | |
| 8,004,990 B1 | 8/2011 | Callon | |
| 8,027,354 B1 | 9/2011 | Portolani et al. | |
| 8,031,606 B2 | 10/2011 | Memon et al. | |
| 8,031,633 B2 | 10/2011 | Bueno et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,060,875 B1 | 11/2011 | Lambeth | |
| 8,131,852 B1 | 3/2012 | Miller et al. | |
| 8,149,737 B2 | 4/2012 | Metke et al. | |
| 8,155,028 B2 | 4/2012 | Abu-Hamdeh et al. | |
| 8,161,270 B1 | 4/2012 | Parker et al. | |
| 8,166,201 B2 | 4/2012 | Richardson et al. | |
| 3,199,750 A1 | 6/2012 | Schultz et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,265,075 B2 | 9/2012 | Pandey | |
| 8,281,067 B2 | 10/2012 | Stolowitz | |
| 8,312,129 B1 | 11/2012 | Miller et al. | |
| 8,339,959 B1 | 12/2012 | Moisand et al. | |
| 8,339,994 B2 | 12/2012 | Gnanasekaran et al. | |
| 8,345,558 B2 | 1/2013 | Nicholson et al. | |
| 8,351,418 B2 | 1/2013 | Zhao et al. | |
| 8,355,328 B2 | 1/2013 | Matthews et al. | |
| 8,456,984 B2 | 6/2013 | Ranganathan et al. | |
| 8,504,718 B2 | 8/2013 | Wang et al. | |
| 8,571,031 B2 | 10/2013 | Davies et al. | |
| 8,611,351 B2 | 12/2013 | Gooch et al. | |
| 8,612,627 B1 | 12/2013 | Brandwine | |
| 8,625,594 B2 | 1/2014 | Safrai et al. | |
| 8,625,603 B1 | 1/2014 | Ramakrishnan et al. | |
| 8,625,616 B2 | 1/2014 | Vobbilisetty et al. | |
| 8,644,188 B1 | 2/2014 | Brandwine et al. | |
| 8,677,451 B1 * | 3/2014 | Bhimaraju | G06F 21/41 |
| | | | 726/8 |
| 8,762,501 B2 | 6/2014 | Kempf et al. | |
| 8,819,259 B2 | 8/2014 | Zuckerman et al. | |
| 8,838,743 B2 | 9/2014 | Ewites et al. | |
| 8,976,814 B2 | 3/2015 | Dipasquale | |
| 9,032,095 B1 | 5/2015 | Traina et al. | |
| 9,548,924 B2 | 1/2017 | Pettit et al. | |
| 9,548,942 B2 | 1/2017 | Deluca et al. | |
| 9,762,507 B1 | 9/2017 | Gandham et al. | |
| 9,838,276 B2 | 12/2017 | Pettit et al. | |
| 9,967,199 B2 | 5/2018 | Ambeth et al. | |
| 10,158,538 B2 | 12/2018 | Pettit et al. | |
| 10,193,771 B2 | 1/2019 | Koponen et al. | |
| 10,498,638 B2 | 12/2019 | Jackson et al. | |
| 10,666,530 B2 | 5/2020 | Koponen et al. | |
| 11,095,536 B2 | 8/2021 | Koponen et al. | |
| 11,539,630 B2 | 12/2022 | Lambeth et al. | |
| 2001/0043614 A1 | 11/2001 | Viswanadham et al. | |
| 2002/0062422 A1 | 5/2002 | Butterworth et al. | |
| 2002/0093952 A1 | 7/2002 | Gonda | |
| 2002/0194369 A1 | 12/2002 | Rawlins et al. | |
| 2003/0028451 A1 * | 2/2003 | Ananian | H04L 63/102 |
| | | | 705/26.42 |
| 2003/0041170 A1 | 2/2003 | Suzuki | |
| 2003/0058850 A1 | 3/2003 | Rangarajan et al. | |
| 2003/0063556 A1 | 4/2003 | Hernandez | |
| 2003/0069972 A1 | 4/2003 | Yoshimura et al. | |

(56) References Cited

U.S. PATENT DOCUMENTS

| | | |
|---|---|---|
| 2003/0093341 A1 | 5/2003 | Millard et al. |
| 2003/0140165 A1 | 7/2003 | Chiu et al. |
| 2003/0191841 A1 | 10/2003 | DeFerranti et al. |
| 2004/0073659 A1 | 4/2004 | Rajsic et al. |
| 2004/0098505 A1 | 5/2004 | Clemmensen |
| 2004/0186914 A1 | 9/2004 | Shimada |
| 2004/0264472 A1 | 12/2004 | Oliver et al. |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0102401 A1* | 5/2005 | Patrick ............... G06F 21/6218 709/225 |
| 2005/0111445 A1 | 5/2005 | Wybenga et al. |
| 2005/0120160 A1 | 6/2005 | Plouffe et al. |
| 2005/0132044 A1 | 6/2005 | Guingo et al. |
| 2005/0182853 A1 | 8/2005 | Ewites et al. |
| 2005/0220096 A1 | 10/2005 | Friskney et al. |
| 2005/0232230 A1 | 10/2005 | Nagami et al. |
| 2006/0002370 A1 | 1/2006 | Rabie et al. |
| 2006/0026225 A1 | 2/2006 | Canali et al. |
| 2006/0028999 A1 | 2/2006 | Jakobashvili et al. |
| 2006/0029056 A1 | 2/2006 | Perera et al. |
| 2006/0037075 A1 | 2/2006 | Frattura et al. |
| 2006/0104286 A1 | 5/2006 | Cheriton |
| 2006/0140118 A1 | 6/2006 | Alicherry et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0206655 A1 | 9/2006 | Chappell et al. |
| 2006/0221961 A1 | 10/2006 | Basso et al. |
| 2006/0246900 A1 | 11/2006 | Zheng |
| 2006/0262778 A1 | 11/2006 | Haumont et al. |
| 2006/0282895 A1 | 12/2006 | Rentzis et al. |
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0156919 A1 | 7/2007 | Potti et al. |
| 2007/0195797 A1* | 8/2007 | Patel ............... H04L 47/10 370/469 |
| 2007/0206086 A1* | 9/2007 | Baron ............... H04N 7/147 348/E7.081 |
| 2007/0258382 A1 | 11/2007 | Foll et al. |
| 2007/0260721 A1 | 11/2007 | Bose et al. |
| 2007/0283412 A1 | 12/2007 | Lie et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0049614 A1 | 2/2008 | Briscoe et al. |
| 2008/0049621 A1 | 2/2008 | McGuire et al. |
| 2008/0049786 A1 | 2/2008 | Ram et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0159301 A1 | 7/2008 | Heer |
| 2008/0240095 A1 | 10/2008 | Basturk |
| 2009/0006607 A1 | 1/2009 | Bu et al. |
| 2009/0010254 A1 | 1/2009 | Shimada |
| 2009/0046581 A1 | 2/2009 | Swaran et al. |
| 2009/0150527 A1 | 6/2009 | Tripathi et al. |
| 2009/0241117 A1* | 9/2009 | Dasgupta ............... G06F 9/5038 718/101 |
| 2009/0282485 A1* | 11/2009 | Bennett ............... H04L 63/145 707/999.003 |
| 2009/0292858 A1 | 11/2009 | Ambeth et al. |
| 2010/0061242 A1* | 3/2010 | Sindhu ............... H04L 49/356 370/235 |
| 2010/0122343 A1* | 5/2010 | Ghosh ............... G06F 21/554 726/23 |
| 2010/0128623 A1 | 5/2010 | Dunn et al. |
| 2010/0131636 A1 | 5/2010 | Suri et al. |
| 2010/0157942 A1 | 6/2010 | An et al. |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0257263 A1 | 10/2010 | Casado et al. |
| 2010/0275199 A1 | 10/2010 | Smith et al. |
| 2010/0306408 A1 | 12/2010 | Greenberg et al. |
| 2011/0022695 A1 | 1/2011 | Dalal et al. |
| 2011/0075664 A1 | 3/2011 | Ambeth et al. |
| 2011/0085461 A1* | 4/2011 | Liu ............... H04L 43/12 370/252 |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0128959 A1 | 6/2011 | Bando et al. |
| 2011/0164503 A1 | 7/2011 | Yong et al. |
| 2011/0185292 A1* | 7/2011 | Chawla ............... G06F 9/5077 709/227 |
| 2011/0185355 A1* | 7/2011 | Chawla ............... G06F 9/45558 718/1 |
| 2011/0194567 A1 | 8/2011 | Shen |
| 2011/0202920 A1 | 8/2011 | Takase |
| 2011/0249970 A1 | 10/2011 | Ddleston et al. |
| 2011/0261825 A1 | 10/2011 | Ichino |
| 2011/0299413 A1 | 12/2011 | Chatwani et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0317559 A1 | 12/2011 | Kern et al. |
| 2011/0317696 A1 | 12/2011 | Aldrin et al. |
| 2012/0054367 A1 | 3/2012 | Ramakrishnan et al. |
| 2012/0079478 A1 | 3/2012 | Galles et al. |
| 2012/0131222 A1* | 5/2012 | Curtis ............... H04L 69/16 709/235 |
| 2012/0159454 A1 | 6/2012 | Barham et al. |
| 2012/0182992 A1 | 7/2012 | Cowart et al. |
| 2012/0233349 A1* | 9/2012 | Aybay ............... H04L 47/2441 709/234 |
| 2012/0243539 A1 | 9/2012 | Keesara |
| 2012/0287791 A1 | 11/2012 | Xi et al. |
| 2013/0024579 A1 | 1/2013 | Zhang et al. |
| 2013/0054761 A1 | 2/2013 | Kempf et al. |
| 2013/0058346 A1 | 3/2013 | Sridharan et al. |
| 2013/0064088 A1 | 3/2013 | Yu et al. |
| 2013/0067067 A1 | 3/2013 | Miri et al. |
| 2013/0163427 A1 | 6/2013 | Beliveau et al. |
| 2013/0163475 A1 | 6/2013 | Beliveau et al. |
| 2013/0286846 A1 | 10/2013 | Atlas et al. |
| 2013/0287026 A1 | 10/2013 | Davie |
| 2013/0322248 A1 | 12/2013 | Guo |
| 2013/0332602 A1 | 12/2013 | Nakil et al. |
| 2013/0339544 A1 | 12/2013 | Mithyantha |
| 2014/0010235 A1* | 1/2014 | Ueno ............... H04L 43/024 370/392 |
| 2014/0019639 A1 | 1/2014 | Ueno |
| 2014/0029451 A1 | 1/2014 | Nguyen |
| 2014/0108738 A1 | 4/2014 | Kim et al. |
| 2014/0115578 A1 | 4/2014 | Cooper et al. |
| 2014/0119203 A1 | 5/2014 | Sundaram et al. |
| 2014/0173018 A1 | 6/2014 | Westphal et al. |
| 2014/0195666 A1 | 7/2014 | Dumitriu et al. |
| 2014/0233421 A1* | 8/2014 | Matthews ............... H04L 49/35 370/253 |
| 2014/0281030 A1 | 9/2014 | Cui et al. |
| 2014/0297597 A1* | 10/2014 | Matsubara ............... G06F 9/461 707/681 |
| 2014/0359134 A1* | 12/2014 | Yoshida ............... G06F 9/4856 709/226 |
| 2014/0372616 A1 | 12/2014 | Arisoylu et al. |
| 2015/0016255 A1 | 1/2015 | Bisht et al. |
| 2015/0026794 A1* | 1/2015 | Zuk ............... H04L 45/64 726/13 |
| 2015/0071072 A1* | 3/2015 | Ratzin ............... G06F 9/544 370/235 |
| 2015/0071076 A1* | 3/2015 | Izhak-Ratzin ............... H04L 47/2408 370/236 |
| 2015/0106804 A1 | 4/2015 | Chandrashekhar et al. |

(56) References Cited

U.S. PATENT DOCUMENTS

| | | |
|---|---|---|
| 2015/0120959 A1 | 4/2015 | Bennett et al. |
| 2015/0124825 A1 | 5/2015 | Dharmapurikar et al. |
| 2015/0163117 A1 | 6/2015 | Lambeth et al. |
| 2015/0163142 A1 | 6/2015 | Pettit et al. |
| 2015/0163144 A1 | 6/2015 | Koponen et al. |
| 2015/0163145 A1 | 6/2015 | Pettit et al. |
| 2015/0163146 A1 | 6/2015 | Zhang et al. |
| 2015/0172075 A1 | 6/2015 | DeCusatis et al. |
| 2015/0180769 A1 | 6/2015 | Wang et al. |
| 2015/0237097 A1* | 8/2015 | Devireddy ............ H04L 67/01 709/203 |
| 2015/0341247 A1 | 11/2015 | Curtis et al. |
| 2016/0094643 A1 | 3/2016 | Jain et al. |
| 2016/0105333 A1 | 4/2016 | Englet et al. |
| 2016/0127227 A1 | 5/2016 | Lee et al. |
| 2016/0134511 A1 | 5/2016 | Wang et al. |
| 2016/0156591 A1 | 6/2016 | Zhou et al. |
| 2016/0182454 A1 | 6/2016 | Phonsa et al. |
| 2017/0118090 A1 | 4/2017 | Pettit et al. |
| 2018/0331961 A1 | 11/2018 | Andrew et al. |
| 2019/0140924 A1 | 5/2019 | Koponen et al. |
| 2020/0351181 A1 | 11/2020 | Koponen et al. |
| 2021/0377134 A1 | 12/2021 | Koponen et al. |

FOREIGN PATENT DOCUMENTS

| | | |
|---|---|---|
| JP | 2003069609 A | 3/2003 |
| JP | 2003124976 A | 4/2003 |
| JP | 2003318949 A | 11/2003 |
| WO | 9506989 A1 | 3/1995 |
| WO | 2004047377 A2 | 6/2004 |
| WO | 2012126488 A1 | 9/2012 |
| WO | 2013184846 A1 | 12/2013 |

OTHER PUBLICATIONS

McKeown, Nick, et al., "OpenFlow: Enabling Innovation in Campus Networks," ACM Sigcomm Computer Communication Review, Apr. 2008, 6 pages, vol. 38, No. 2, ACM.

Pfaff, Ben., et al., "Extending Networking into the Virtualization Layer," Proc. Of HotNets, Oct. 2009, 6 pages.

Phan, Doantam, et al., "Visual Analysis of Network Flow Data with Timelines and Event Plots," VizSEC 2007, Month Unknown 2007, 16 pages.

Tavakoli, Arsalan, et al., "Applying NOX to the Datacenter," Proc. HotNets, Month Unknown 2009, 6 pages.

\* cited by examiner

Thin Agent

Elephant Detector ns of a Machine
to Detect Elephant Flows

CLAIM OF BENEFIT TO PRIOR APPLICATIONS

This application is a continuation application of U.S. patent application Ser. No. 15/972,232, filed May 7, 2018, now published as U.S. Patent Publication 2018/0331961. U.S. patent application Ser. No. 15/972,232 is a continuation application of U.S. patent application Ser. No. 14/502,102, filed Sep. 30, 2014, now issued as U.S. Pat. No. 9,967,199. U.S. patent application Ser. No. 14/502,102 claims the benefit of U.S. Provisional Patent Application 61/913,899, filed Dec. 9, 2013, U.S. Provisional Patent Application 61/973,255, filed Mar. 31, 2014, and U.S. Provisional Patent Application 62/010,944, filed Jun. 11, 2014. U.S. patent application Ser. No. 15/972,232, now published as U.S. Patent Publication 2018/0331961, U.S. patent application Ser. No. 14/502,102, now issued as U.S. Pat. No. 9,967,199, and U.S. Provisional Patent Applications 61/913,899, 61/973,255, and 62/010,944 are incorporated herein by reference.

BACKGROUND

Today, a datacenter may process different types of flows, including elephant flows and mouse flows. An elephant flow represents a long-lived flow or a continuous traffic flow that is typically associated with high volume connection. Different from an elephant flow, a mouse flow represents a short-lived flow. Mice are often associated with bursty, latency-sensitive applications, whereas elephants tend to be associated with large data transfers in which throughput is far more important than latency.

A problem with elephant flows is that they tend to fill network buffers end-to-end, and this introduces non-trivial queuing delay to anything that shares these buffers. For instance, a forwarding element may be responsible for managing several queues to forward packets, and several packets belonging to a mouse flow may be stuck in the same queue behind a group of other packets belonging to an elephant flow. In a network of elephants and mice, this means that the more latency-sensitive mice are being affected. Another problem is that mice are generally very bursty, so adaptive routing techniques are not effective with them.

BRIEF SUMMARY

Some embodiments provide a system that detects whether a data flow is an elephant flow; and if so, the system treats it differently than a mouse flow. The system of some embodiments detects an elephant flow by examining, among other items, the operations of a machine. The elephant flow represents a long-lived data flow or a continuous traffic flow that is associated with large data transfer. In some embodiments, the machine is a physical machine or a virtual machine (VM). In detecting, the system uses machine introspection to identify an initiation of a new data flow associated with the machine. The new data flow can be an outbound data flow or an inbound data flow. The system then tracks how much data the machine is sending or receiving through the connection, and determines, based on the amount of data being sent or received, if the data flow is an elephant flow.

Different embodiments use different techniques to identify the initiation of a new flow of data that is associated with the machine. In some embodiments, the system identifies a new data flow by intercepting a network connection that is being opened on the machine. The connection can be an inbound network connection and/or an outbound network connection. In intercepting, the system of some embodiments performs a network introspection operation on the machine to intercept a socket call being made to open the new network connection.

The system of some embodiments identifies the initiation of a new data flow by capturing a request to transfer (e.g., send or receive) a file. That is, rather than through a low-level socket call, the system of some embodiments detects an operating system (OS)/library or application programming interface (API) call to send or receive a file. The call may be associated with a particular network protocol for transferring files from one network host to another network host. Examples of different widely used data transfer protocols include file transfer protocol (FTP), Secure Shell (SSH) file transfer protocol, Bit Torrent, etc.

In some embodiments, the system uses one of several different methods to determine the amount of data that is being transferred in a data flow. For some embodiments that detect elephant flows based on file transfer requests, the system makes this determination based on the size of the file that is being transferred. For instance, the system can identify the size of the file, and if the file is over a threshold size, the system can specify that the associated data flow is an elephant flow.

Instead of identifying a file size, the system of some embodiments tracks the amount of data that has been transferred (e.g., sent or received). In some embodiments, the system tracks the data size associated with every packet transferred in a data flow (e.g., through a network connection). For instance, the system may calculate the amount of data transferred by accumulating or adding the number of bytes transferred with each packet. If the number of bytes is over a threshold value, the system of some embodiments declares the data flow to be an elephant flow. In some embodiments, the system includes a machine that marks packet with a marking and a packet inspection agent uses the mark to track the amount of data sent and identify an elephant flow if the amount is over a threshold value.

In conjunction with byte count or instead of it, the system of some embodiments factors in time. As an example, the system might detect an elephant flow solely based on how long the data flow has been associated with the machine. That is, if the duration of the data flow is over a set period of time, the system might determine that the data flow is an elephant flow. The duration can be calculated based on how long a network connection has been opened to handle the data flow. Also, instead of byte count, the process might calculate bit rate or bytes per second. The bit rate can be used to allow elephant flows with slow data transfer rate to progress as normal. This is because such elephant flows with slow transfer rate may not be contributing or at least significantly in the latency of other data flows, such as mice flows and non-detected elephant flows.

The system of some embodiments identifies one or more pieces of information that provide context regarding the detected elephant flow. In some embodiments, the context information is used to identify the elephant flow. The context information may include user data, application data, and/or machine data. For instance, the system may identify the name of the source machine, the address (e.g., MAC address, IP address) associated with the source machine, the address associated with a destination machine, a port number (e.g., TCP port number, UDP port number), the application that initiated the call, user data (e.g., username of the person that is logged onto the machine), etc. In some embodiments, the source of the data flow is identified by source MAC address, source IP address, and source port. The destination may also be identified by same set of tuples or fields.

Once an elephant flow is detected, the system of some embodiments treats the detected elephant flow differently than other flows (e.g., mouse flows, non-detected elephant flows). In some embodiments, the system reports the elephant flow and the associated context information (e.g., MAC address, IP address, etc.) to an agent that is interested in the elephant flow. For instance, the system may send a report to a forwarding element, such as a switch or router. The forwarding element may then use Quality of Service (QOS) configuration to place packets belonging to the elephant flow in a particular queue that is separate from one or more other queues with other packets. In this manner, one set of packets belonging to a mouse flow is not stuck in the same queue behind another set of packets belonging to an elephant flow.

Alternatively, the system may send packets associated with an elephant flow along different paths (e.g., equal-cost multipath routing (ECMP) legs) to break the elephant flow into mice flows. As another example, the system may send elephant flow traffic along a separate physical network, such as an optical network that is more suitable for slow changing, bandwidth-intensive traffic. In some embodiments, the system reports the elephant flow to a network controller (e.g., a software-defined networking controller) that can configure one or more forwarding elements to handle the elephant flow.

Additional techniques for detecting and handling elephant flows are described in U.S. patent application Ser. No. 14/231,647, entitled "Detecting and Handling Elephant Flows", filed Mar. 31, 2014, now issued as U.S. Pat. No. 10,193,771. Furthermore, several embodiments that detect an elephant flow based on the size of a packet are described in U.S. patent application Ser. No. 14/231,652, entitled "Detecting an Elephant Flow Based on the Size of a Packet", filed Mar. 31, 2014, now issued as U.S. Pat. No. 9,548,924. Some embodiments that report elephant flows to a network controller are described in U.S. patent application Ser. No. 14/231,654, entitled "Reporting Elephant Flows to a Network Controller, filed Mar. 31, 2014, now issued as U.S. Pat. No. 10,158,538. These U.S. patent applications are incorporated herein by reference.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Embodiments described herein provide a system that detects whether a data flow is an elephant flow; and if so, the system treats it differently than a mouse flow. The system of some embodiments detects an elephant flow by examining, among other things, the operations of a machine. The elephant flow represents a long-lived data flow or a continuous traffic flow that is associated with large data transfer. In some embodiments, the machine is a physical machine or a virtual machine (VM). In detecting, the system identifies an initiation of a new data flow associated with the machine. The new data flow can be an outbound data flow or an inbound data flow. The system then determines, based on the amount of data being sent or received, if the data flow is an elephant flow.

Figure 1:
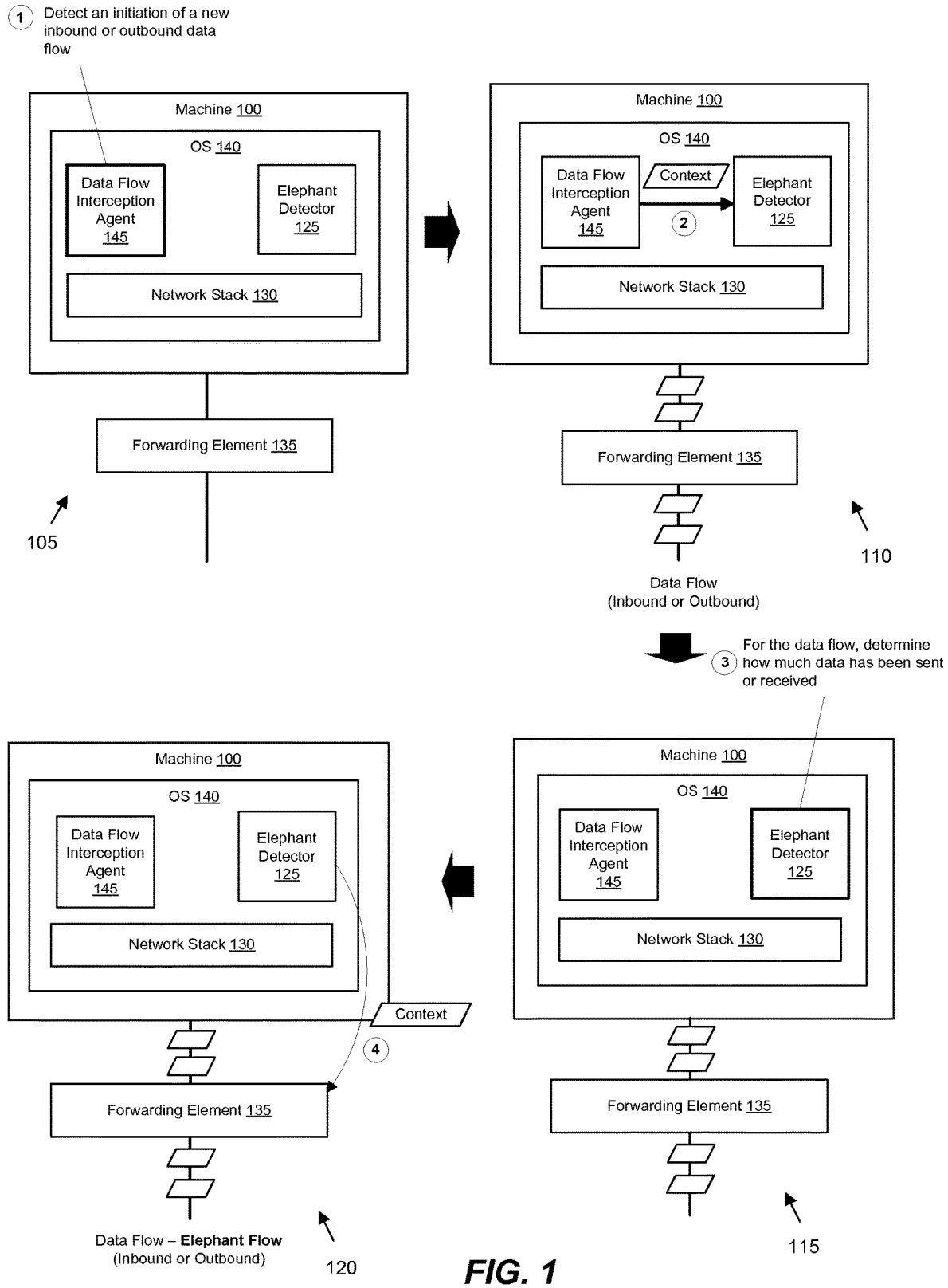
FIG. 1 illustrates an example of inspecting operations of a machine to detect an elephant flow.

For some embodiments of the invention, FIG. 1 illustrates an example of inspecting operations of a machine 100 to detect an elephant flow. Specifically, this figure illustrates in four stages 105-120 an example of (1) detecting an initiation or a new data flow, (2) determining the amount of data being sent or received in the data flow, and (3) specifying that the data flow is an elephant flow based on the amount of data. The figure includes the machine 100 that runs on the operating system (OS) 140. The OS 140 includes a data flow interception agent 140, an elephant detector 125, and a network stack 130. The figure also includes a forwarding element 135 that forwards packets for the machine 100. The term "packet" is used here as well as throughout this application to refer to a collection of bits in a particular format sent across a network. It should be understood that the term "packet" may be used herein to refer to various formatted collections of bits that may be sent across a network, such as Ethernet frames, TCP segments, UDP datagrams, IP packets, etc.

In the example of FIG. 1, the machine 100 can be a physical machine or a virtual machine (VM). Different from a physical or dedicated machine, the VM runs on a hypervisor of a host machine. The hypervisor can be a type 1 bare-metal hypervisor or a type 2 hosted hypervisor. For instance, the hypervisor can be a bare-metal hypervisor, which serves as a software abstraction layer that runs on top of the machine's hardware and runs below any OS.

In some embodiments, the data flow interception agent 145 is a component of the OS 140 that is responsible for detecting an initiation of a new data flow associated with the machine 100. The data flow can be an inbound data flow, which means that the data will be sent to the machine from another machine or network host. Alternatively, the data flow can be an outbound data flow, which means that the data will be sent from the machine to another machine. In detecting a new data flow, the data flow interception agent 145 may intercept each new network connection that is being initiated or opened on the machine. For instance, the data flow interception agent may perform a network introspection operation to intercept a socket call being made to open a new network connection to handle the data flow.

Alternatively, the data flow interception agent 145 of some embodiments identifies each new data flow based on a request to send or receive a file. That is, rather than through a low-level socket call, the data flow interception agent detects an OS/library or application programming interface (API) call to transfer (e.g., send or receive) a file. The call may be associated with a particular protocol to transfer files from one network host to another network host. Examples of different widely used data transfer protocols include file transfer protocol (FTP), Secure Shell (SSH) file transfer protocol, Bit Torrent, etc.

In some embodiments, the data flow interception agent 145 is a native component of the OS. That is, the data flow interception agent comes preinstalled with the OS. The data flow interception agent 145 may be a component that is installed on the OS. For instance, the data flow interception may be a thin agent or a part of a thin agent that is installed on the machine to perform network introspection. The thin agent may operate on the machine to intercept different types of events that are occurring on the machine. For instance, the thin agent may include a network introspection module to intercept each system call to open a new network connection, a file introspection module to intercept each system call to open a data file, etc.

Different from the data flow interception agent 145, the elephant detector 125 is responsible for determining whether the identified data flow is an elephant flow rather than a mouse flow. In determining, the elephant detector 125 of some embodiments identifies that the amount of data being sent or received is over a threshold value. The elephant detector can use one of several different methods to determine the amount of data that is being transferred with a data flow. For some embodiments that detect elephant flows based on file transfer requests, the elephant detector 125 makes this determination based on the size of the file that is being transferred in the data flow. For instance, the elephant detector 125 can identify the size of the file, and if the file is over the threshold value, the elephant detector can specify that the data flow is an elephant flow.

Instead of identifying a file size, the elephant detector 125 of some embodiments tracks the amount of data that has been transferred (e.g., sent or received). In some embodiments, the elephant detector 125 tracks the data size associated with every packet transferred in a data flow (e.g., through a network connection). For instance, the elephant detector 125 may calculate the amount of data transferred by accumulating or adding the number of bytes transferred with each packet. If the number of bytes is over a threshold value, the elephant detector 125 of some embodiments declares the data flow to be an elephant flow.

In conjunction with byte count or instead of it, the elephant detector 125 of some embodiments factors in time. As an example, the elephant detector 125 might detect an elephant flow solely based on how long the data flow has been associated with the machine. That is, if the duration of the data flow is over a set period of time, the elephant detector 125 might determine that the data flow is an elephant flow. The duration can be calculated based on how long a network connection has been opened to handle the data flow. Also, instead of byte count, the process might calculate bit rate or bytes per second. The bit rate can be used to allow elephant flows with slow data transfer rate to progress as normal. This is because such elephant flows with slow transfer rate may not be contributing or at least significantly in the latency of other data flows, such as mice flows and non-detected elephant flows.

In the example of FIG. 1, the elephant detector 125 is shown as a component that runs on the OS 140 of the machine 100. However, the elephant detector 125 may be a part of a hypervisor that executes on a host machine, a component or module that executes on a separate machine (e.g., virtual or physical machine), or a dedicated appliance.

The network stack 130 conceptually represents the OS's implementation of a number of different protocols to send and receive data through a network. The network stack 130 may be a part of the OS's kernel. The network stack, such as the TCP/IP network stack, is used to process data through several different layers. For instance, when outputting data from the machine, the data may be sent to a socket buffer and processed at the TCP layer to create TCP segments or packets. Each segment is then processed by a lower layer, such as the IP layer to add an IP header. The output of the network stack is a set of packets associated with the outbound data flow. Each packet may be processed (e.g., segmented) by the machine's network interface card, and sent to the forwarding element 135. On the other hand, when receiving data at the machine, each packet may be processed by one or more of the layers in reverse order to strip one or more headers, and place the user data or payload in an input socket buffer.

In some embodiments, the forwarding element 135 is a hardware-forwarding element. The hardware-forwarding element can have application-specific integrated circuits (ASICs) that are specifically designed to support in-hardware forwarding. Alternatively, the physical forwarding element 135 can be a software-forwarding element, such as Open vSwitch (OVS). In some embodiments, the forwarding element (e.g., software or hardware forwarding element) is a physical forwarding element that operates in conjunction with one or more other physical forwarding elements to collectively implement different logical forwarding elements (e.g., logical switches, logical routers, etc.) for different logical networks of different tenants, users, departments, etc. that use the same shared computing and networking resources. Accordingly, the term "physical forwarding element" is used herein to differentiate it from a logical forwarding element.

In some embodiments, the forwarding element 135 is an edge forward element (EFE). In some embodiments, the edge forwarding element represents a last forwarding element before one or more end machines (e.g., the machine 100). Alternatively, the forwarding element 135 can be a non-edge forwarding (NEFE). Irrespective of whether the forwarding element 135 is positioned at the edge of the network or not, the forwarding element is configured to treat packets associated with a detected elephant flow differently than other packets associated with other data flows (e.g., mouse flows, non-detected elephant flows).

Having described several components of FIG. 1, example operations of these components will now be described by reference to the four stages 105-120 that are illustrated in the figure. The first stage 105 shows that the machine 100 is communicatively coupled to the forwarding element 135. The data flow interception agent 145 operates on the OS 140 of the machine 100 to detect an initiation of a new data flow. In the first stage 105, the data flow interception agent 145 has detected a new data flow being initiated. The data flow interception agent 145 might have made the detection by intercepting a call to open or use a particular network connection to handle the new data flow. In some embodiments, the data flow interception agent 145 detects a new data flow by intercepting an application request to send or receive a file.

The second stage 110 shows the data flow interception agent 145 sending context data associated with the data flow to the elephant detector 125. As mentioned above, the context information can include user data, application data, and/or machine data. For instance, the system may identify the name of the source machine, the address (e.g., MAC address, IP address) associated with the source machine, the address associated with a destination machine, a port number associated the source and/or destination, the application that initiated the call, user data (e.g., username of the person that is logged onto the machine, etc. In some embodiments, the source is identified as a combination of source IP address, and port number; and the destination is identified by a combination of destination IP address and port number.

The second stage 110 also shows that the new data flow has been started. This is conceptually shown with several packets being forwarded by the forwarding element 135.

The third stage 115 shows the elephant detector 125 determining that the data flow is an elephant flow. As mentioned above, the elephant flow detector 125 can make this determination based on the size of the file that is being transferred in the data flow. For instance, the elephant detector can identify the size of the file; and if the file is over the threshold value, the elephant detector can specify that the data flow is an elephant flow. Instead of identifying a file size, the elephant detector may track the amount of data that has been transferred. For instance, the elephant detector may calculate the amount of data transferred by accumulating or adding the number of bytes transferred with each packet.

The fourth stage 120 shows an example operation of the elephant detector 125 upon detecting the elephant flow. Here, the elephant flow detector 125 reports the elephant flow to the forwarding element 135. The forwarding element 135 may then use Quality of Service (QOS) configuration to place packets belonging to the elephant flow in a particular queue that is separate from one or more other queues with other packets). In this manner, one set of packets belonging to a mouse is not stuck in the same queue behind another set of packets belonging to an elephant.

Alternatively, the forwarding element 135 may send packets associated with an elephant flow along different paths (e.g., equal-cost multipath routing (ECMP) legs) to break the elephant flow into mice flows. As another example, the forwarding element 135 may send elephant flow traffic along a separate physical network, such as an optical network that is more suitable for slow changing, bandwidth-intensive traffic. In some embodiments, the elephant detector reports the elephant flow to a network controller (e.g., a software-defined networking controller) that can configure one or more forwarding elements (e.g., the forwarding element 100) to handle the elephant flow.

Figure 2:
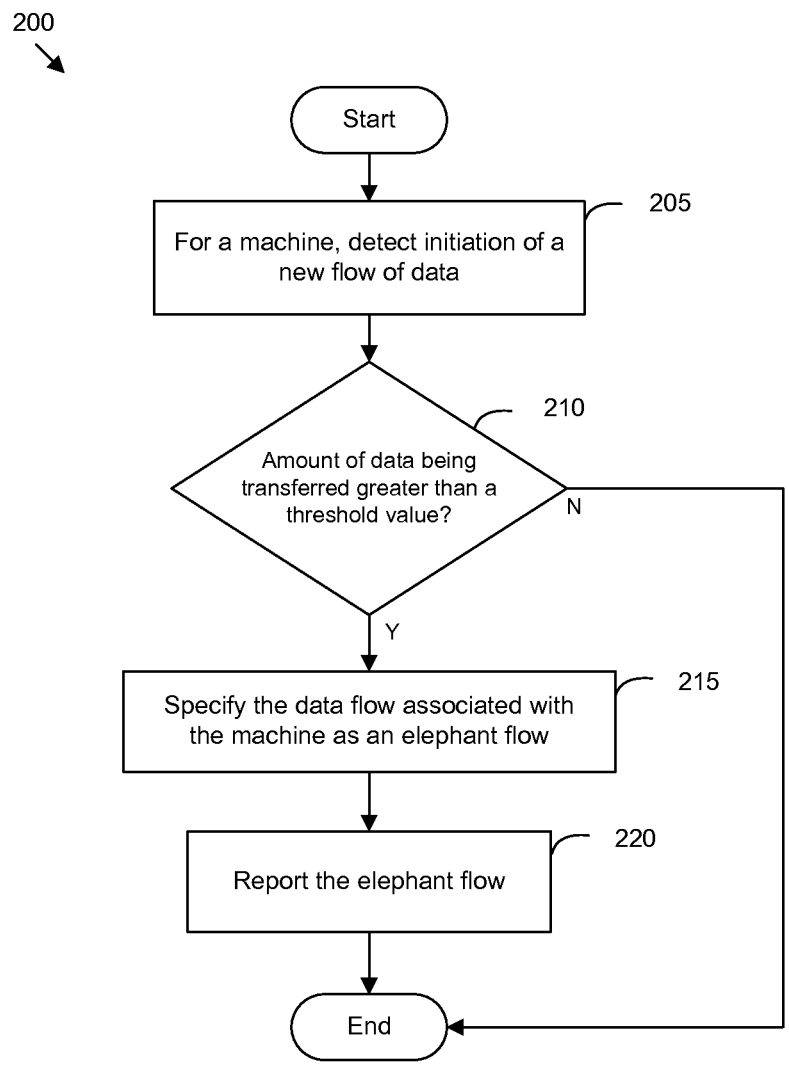
FIG. 2 conceptually illustrates a process that some embodiments implement to detect an elephant flow.

Having described an example of detecting an elephant flow, a process will now be described by reference to FIG. 2. FIG. 2 conceptually illustrates a process 200 that some embodiments implement in order to detect elephant flows. In some embodiments, the process 200 is performed by one or more components shown in FIG. 1, such as the data flow interception agent 145 and the elephant detector 125.

As shown in FIG. 2, the process 200 begins when it identifies (at 205) a new flow of data that is associated with a machine. The data flow can be an inbound or outbound data flow. The process 200 then determines (at 210) whether the amount of data being sent or received is greater than a threshold value. If the amount is not over, the process 200 ends. However, if the amount is over, the process 200 specifies (at 215) that the data flow is an elephant flow. The process 200 then reports (at 220) the elephant flow to an agent that is interested in the report. The agent that receives a message regarding the elephant flow may be operating on the same operating system (OS) as the elephant detector, the same machine (e.g., as a part of a virtual switch, as a part of a hypervisor, as part of a service virtual machine), or another machine or device (e.g., as part of a network controller which controls one or more software or hardware forwarding elements, as a part of hardware switch, as part of a dedicated appliance, etc.). In some embodiments, the agent on the same machine facilitates in marking packets associated with the elephant flow with a particular mark. As an example, the agent may mark each packet associated with an elephant flow using a Differentiated Services Code Point (DSCP) field that provide different levels of service to be assigned to network traffics, such as IP packets. The process 200 then ends.

In some embodiments, the process 200 performs other calculation to determine whether a data flow is an elephant flow. In conjunction with byte count or instead of it, the process 200 of some embodiments factors in time. As an example, the process 200 might detect an elephant flow solely based on how long the data flow has been associated with the machine. That is, if the duration of the data flow is over a set period of time, the process 200 might determine that the data flow is an elephant flow. The duration can be calculated based on how long a network connection has been opened to handle the data flow. Also, instead of byte count, the process 200 might calculate bit rate or bytes per second. The bit rate can be used to allow elephant flows with slow data transfer rate to progress as normal. This is because such elephant flows with slow transfer rate may not be contributing or at least significantly in the latency of other data flows.

Some embodiments perform variations on the process 200. The specific operations of the process 200 may not be performed in the exact order shown and described. The specific operations may not be performed in one continuous series of operations, and different specific operations may be performed in different embodiments.

Several more examples of detection and handling elephant flows will be described in detail below. Section I describes several additional examples of detecting elephant flows based on machine introspection. In particular, Section I.A describes an example of detecting a new data flow by intercepting a network connection that is being opened on the machine. Section I.B then describes an example of detecting a new data flow by capturing a request to transfer a file. This is followed by Section I.C, which describes an example of detecting an elephant flow using a combination of machine introspection and packet inspection. Section II then describes an example electronic system with which some embodiments of the invention are implemented.

I. Examples of Detecting Elephant Flows Based on Machine Introspection

In some embodiments, the system detects an elephant flow by monitoring, among other things, the operations of a machine. In detecting, the system uses machine introspection to intercept a new network connection that is being initiated on the machine. The system then identifies context information associated with the connection. The context information can include one or more of the following: the name of the source machine, the address (e.g., MAC address, IP address) associated with the source machine, the address associated with a destination machine, a port number for the source and/or destination, the application that initiated the call, user data (e.g., username of the person that is logged onto the machine), etc. The system then uses machine introspection to track how much data the machine is sending or receiving through the connection. The system then determines, based on the amount of data being sent or received, whether the data flow associated with the connection is an elephant flow. If the system detects an elephant flow, it reports the elephant flow and the associated context information to an agent (e.g., a forwarding element, a network controller) that is interested in the elephant flow.

The system of some embodiments can also, or alternatively, detect an elephant flow based on high-level application calls, rather than low-level system calls. As an example, the system might detect an OS/library or application programming interface (API) call to send or receive a file. The system then determines whether an elephant flow is associated with the call by identifying the size of the file that is being transferred. If the size is greater than a threshold value, the system then reports the elephant flow to the agent. In some embodiments, the system detects an elephant flow using a combination of machine introspection and packet inspection. Several such examples will now be described below by reference to FIG. 3-10.

A. Introspecting Control Path and Data Path

Figure 3:
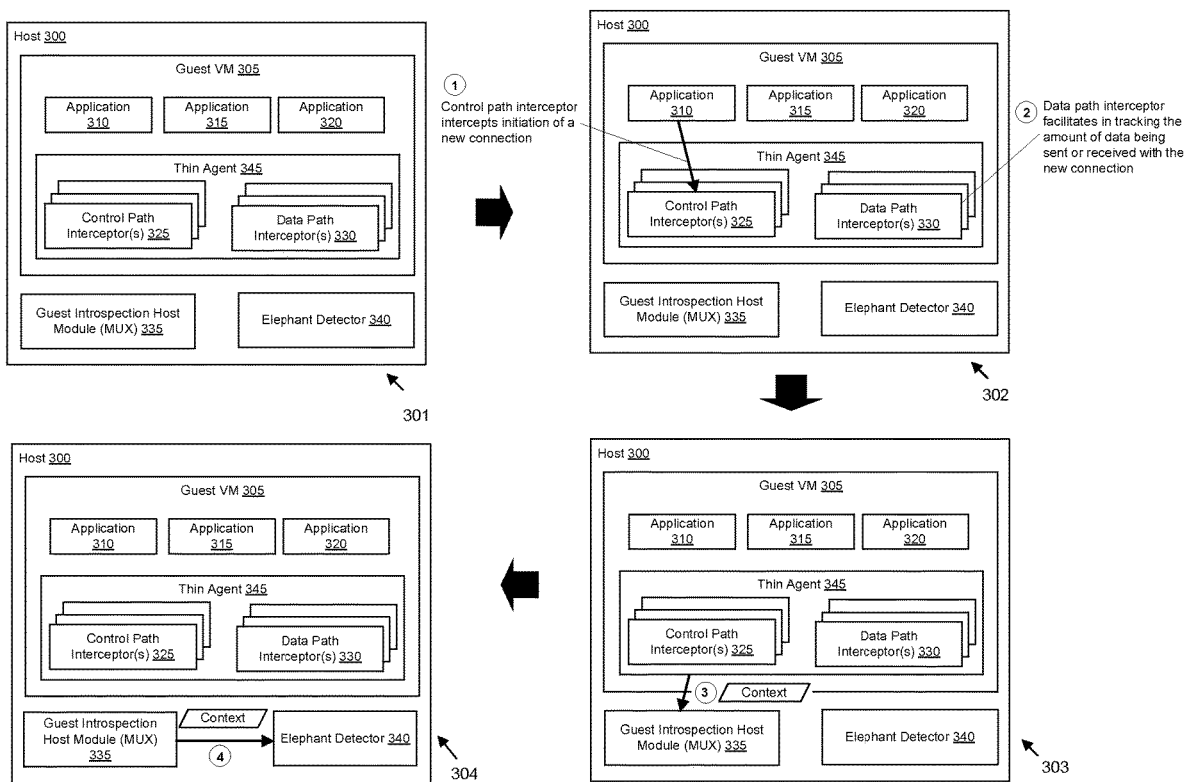
FIG. 3 illustrates an example of inspecting operations of a machine to detect an elephant flow.

FIG. 3 illustrates an example of inspecting operations of a machine to detect an elephant flow. Specifically, this figure shows in four stages 301-304 how an introspection agent 345 on a machine 305 detects a new network connection and reports the new connection to an elephant detector 340. The elephant detector 340 then determines the amount of data transferred with the network connection. If the amount is over a threshold value, the elephant flow detector 340 sends a message regarding the elephant flow to any party or agent that is interested in such a report.

In the example of FIG. 3, the machine 305 is a guest virtual machine (VM) that executes on a host machine 300. However, it should be understood that the example shown in the figure is equally applicable to a physical machine. As shown, the introspection agent 345 is a thin agent that is installed on the operating system (OS) of the guest VM 305. The elephant detector 340 is a component that operates on the host machine 300. For instance, the elephant detector 340 may be a component that executes on a separate VM than the guest VM 305. The figure also shows a number of applications 310-320. These applications could be any different type of applications that send data over a network.

In some embodiments, the thin agent 345 operates on the VM 305 and intercepts different types of events that are occurring on the VM. From a control path point of view, the thin agent 345 may intercept a new network connection being made and/or a file being opened. For instance, when a user sends a file through an application (310, 315, or 320), the thin agent 345 may detect that the application has made a socket call to open a new connection.

To trap control data events, the thin agent 345 of some embodiments includes a set of one or more control path interceptors 325. One example of a control path interceptor 325 is a network introspection module that intercepts socket calls being made on the VM 305 to open a new network connection. For each intercepted call, the network introspection module may identify various pieces of information (e.g., contextual information) associated with the call. The network introspection module may identify the name of the VM, the address (e.g., MAC address, IP address) associated with the VM, the address associated with the destination machine, a port number for the source and/or destination, the application that initiated the call, user data (e.g., username of the person that is logged onto the VM), etc. The thin agent 345 can include different types of control path interceptors to perform machine introspection, such as a file introspection module that detects calls to open different files.

To trap information on the data path, the thin agent 345 of some embodiments includes a set of one or more data path interceptors 330. In some embodiments, a data path interceptor 330 identifies the size of data associated with each packet transferred over the network connection. In some embodiments, the data size is the size of the payload or user data of the packet. Alternatively, the data size may be the actual size of the packet including one or more protocol headers and trailers. In some embodiments, the data path interceptor 330 reports the data size associated with each packet to the elephant detector 340. To optimize processing, the data path interceptor may report the data size once it reaches a certain limit, in some embodiments.

The elephant detector 340 of some embodiments tracks the amount of data that has been transferred (e.g., sent or received) with the network connection. In determining the amount of data being sent or received, the elephant detector may receive the data size of each packet with a unique identifier for the data flow or the network connection. If the data amount reaches a threshold value, the elephant detector then correlates the unique identifier with the context information. Thereafter, the elephant detector may report the elephant flow and the associated context information.

In some embodiments, the thin agent 345 or another component on the guest VM 305 performs the data size aggregation and elephant flow detection. For instance, if the thin agent is aware of the threshold value, the thin agent can add the data size associated with each packet to determine whether the amount of data transferred is greater than the threshold value.

As shown in FIG. 3, a guest introspection host module 335 (hereinafter referred to as a multiplexer (MUX)) operates on the host 300. The MUX 335 receives intercepted data from the thin agent 345. The MUX 335 then forwards the intercepted data to one or more components, appliances, and/or devices that are interested in that data. For example, a component operating on the host 300 may be registered with the MUX 335 to receive an asynchronous notification each time a certain type of control path event is intercepted by the thin agent 345 on the VM 305.

In some embodiments, the elephant detector 340 detects elephant flows using information provided by the thin agent 345 via the MUX 335. In the example of FIG. 3, the elephant detector is shown as a component that execute on the host 300. For instance, the elephant detector 340 may be a component that executes on a separate VM than the guest VM 305. Alternatively, the elephant detector 340 may be a part of a hypervisor that executes on the host, a component that executes on a separate physical machine, or a dedicated appliance.

Having described example components of FIG. 3, example operations of these components will now be described by reference to the four stages 301-304 that are illustrated in the figure. The first stage 301 shows the VM 305 executing on the host 300. The thin agent 345 has been installed on the OS of the VM 305. The control path interceptor 325 is registered to intercept calls to create new network connections. The thin agent 345 may have previously updated information regarding the user that is logged onto the OS. The user information is updated because that the thin agent 345 of some embodiments reports the information with each intercepted event.

The second stage 302 shows the thin agent 345 intercepting a request made by the application 310 to open a new connection. In particular, the control path interceptor 325 intercepts a socket call and identifies information regarding the socket call. The control path interceptor 325 may identify the application 310 that initiated the call, user data, the type of connection (e.g., inbound or outbound), the address (e.g., MAC address, IP address) associated with the VM, the address associated with the destination machine, a port number, etc.

The second stage 302 also shows the thin agent 345 facilitating in detecting the amount of data being sent or received through the network connection. As mentioned above, the data path interceptor 330 reports the file or data size associated with each packet to the elephant detector 340. To optimize processing, the data path interceptor may report the data size once it reaches a certain limit, in some embodiments.

The third stage 303 illustrates the thin agent 345 sending data to the MUX 335 regarding the new connection. The thin agent 345 of some embodiments sends the data upon trapping the data. That is, the thin agent 345 does not wait for a specified period of time but sends the data immediately to the MUX 335. The thin agent 345 might format the data in a particular format prior to sending it to the MUX 335. For instance, the thin agent might encode the data in JavaScript Object Notation (JSON) or Extensible Markup Language (XML). In some embodiments, the thin agent 345 maintains a local copy of each event. For a given session, the thin agent 345 may maintain a log of all intercepted events. The local copy provides a backup in case there is a communication error between the thin agent 345 and the MUX 335.

The fourth stage 304 illustrates the MUX 335 sending the data to the elephant detector 340. Here, the MUX 335 provides the data asynchronously or synchronously to the elephant detector 340. The MUX 335 may also store the data in storage (not shown) prior to sending the data to the elephant detector 340. The MUX 335 may receive the data in one format and send the data in the same format or different format to the elephant detector 340, in some embodiments.

In the fourth stage 304, the elephant detector 340 receives the data from the MUX 335. The elephant detector 340 then uses the data to track the amount of data flowing through the network connection. If the amount exceeds a threshold value, the elephant detector 340 may specify that the data flow associated with the connection is an elephant flow. The elephant detector 340 may then report the elephant flow to agent or party that is interested in the report. For instance, in some embodiments, the elephant detector reports the elephant flow to a network controller, which in turn configures one or more forwarding elements to handle the elephant flow. Alternatively, the report may be sent directly to a forwarding element.

In the example described above, the thin agent 345 intercepts the initiation of a new connection, and gathers data relating to the connection (e.g., data size of each packet, context data). The thin agent 345 then provides the data to the MUX 335, which in turn provides the data to the elephant flow detector 340.

Figure 4:
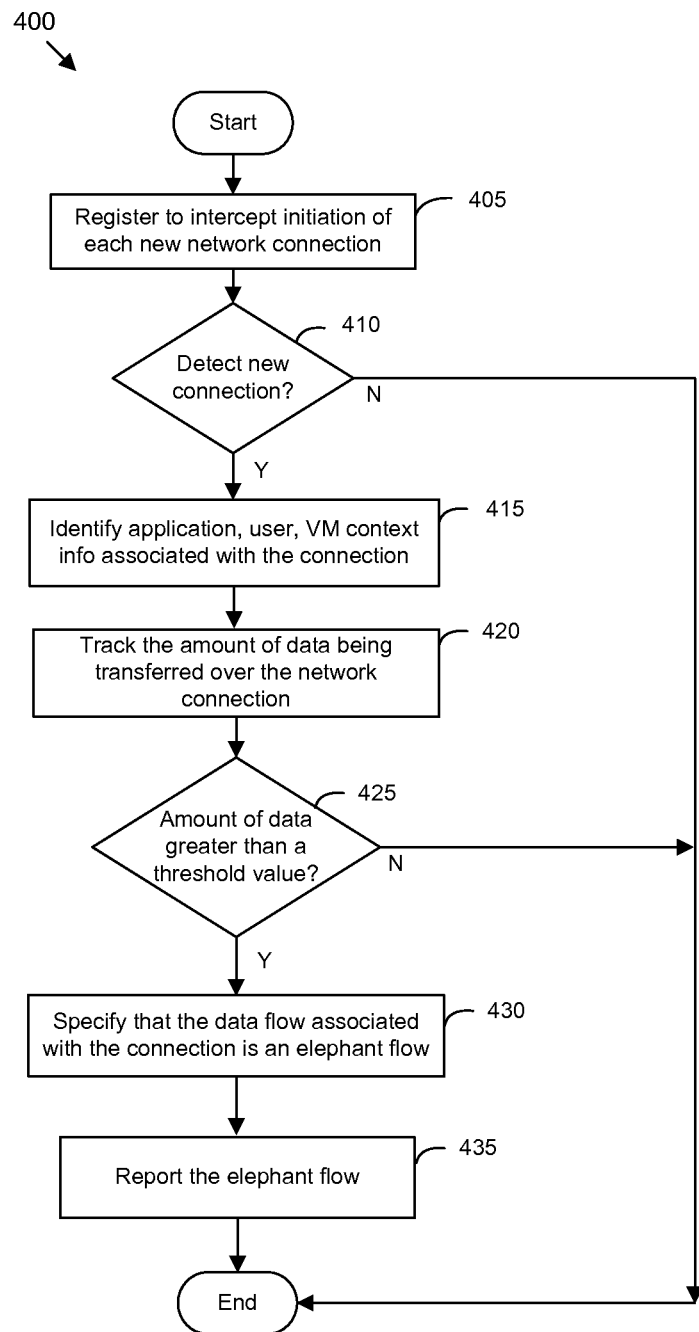
FIG. 4 illustrates a process that some embodiments implement to intercept a new connection for a data flow and determine whether the data flow is an elephant flow.

FIG. 4 illustrates a process 400 that some embodiments implement to intercept a new connection for a data flow and determine whether the data flow is an elephant flow. In some embodiments, the process 400 is performed by one or more components shown in FIG. 3, such as the thin agent 345 and the elephant detector 340.

As shown in FIG. 4, the process 400 begins when it registers (at 405) to intercept the initiation of any new network connections (e.g., outbound network connections, inbound network connections). The process 400 then begins detecting whether a new connection has been initiated. For instance, the process 400 of some embodiments detects (at 410) whether a socket call has been made to open a new connection. If such a call has been made, the process 400 identifies (at 415) the application, the user, VM context information associate with the connection. The process 400 then tracks (at 420) the amount of data being transferred (e.g., sent or received) over the network connection.

At 425, the process 400 determines whether the amount of data being sent or received is greater than a threshold value. If the amount is over, the process 400 specifies (at 430) that the data flow is an elephant flow. The process 400 then reports (at 435) the elephant flow (e.g., to a forwarding element and/or a network controller). The agent that receives a message regarding the elephant flow may be operating on the same operating system (OS) as the elephant detector 340, the same machine (e.g., as a part of a virtual switch, as a part of a hypervisor, as part of a service virtual machine, etc.) or another machine or device (e.g., as part of a network controller which controls one or more software or hardware forwarding elements, as a part of hardware switch, as part of a dedicated appliance, etc.). In some embodiments, the agent on the same machine facilitates in marking packets associated with the elephant flow with a particular mark. As an example, the agent may mark each packet associated with an elephant flow using a Differentiated Services Code Point (DSCP) field that provide different levels of service to be assigned to network traffics, such as IP packets. If the amount of data transferred is not greater than the threshold value, the process 400 assumes that the data flow associated with the connection is a mouse flow and does not report it. The process 400 then ends.

Some embodiments perform variations on the process 400. The specific operations of the process 400 may not be performed in the exact order shown and described. The specific operations may not be performed in one continuous series of operations, and different specific operations may be performed in different embodiments. For instance, the tracking operation 420 may be performed by different components, such as the thin agent or the elephant detector. As mentioned above, if the thin agent is aware of the threshold value, the thin agent may aggregate the data size and perform the elephant flow detection. Also, the thin agent might send data to the elephant agent through one or more intermediary agents (e.g., the MUX).

B. High-Level Application Calls

In the example described above, the thin agent intercepts a socket call to open a new network connection. The system of some embodiments can detect an elephant flow based on an application call for a new file transfer. As an example, the system might detect an OS/library or application programming interface (API) call to send or receive a file. The call may be associated with a particular network protocol for transferring files from one network host to another network host. Examples of different widely used data transfer protocols include file transfer protocol (FTP), Secure Shell (SSH) file transfer protocol, Bit Torrent, etc. The system then determines whether an elephant flow is associated with call by identifying the size of the file that is being transferred with the call. If the size is greater than a threshold value, the system then reports the elephant flow to an agent that is interested in the report.

Figure 5:
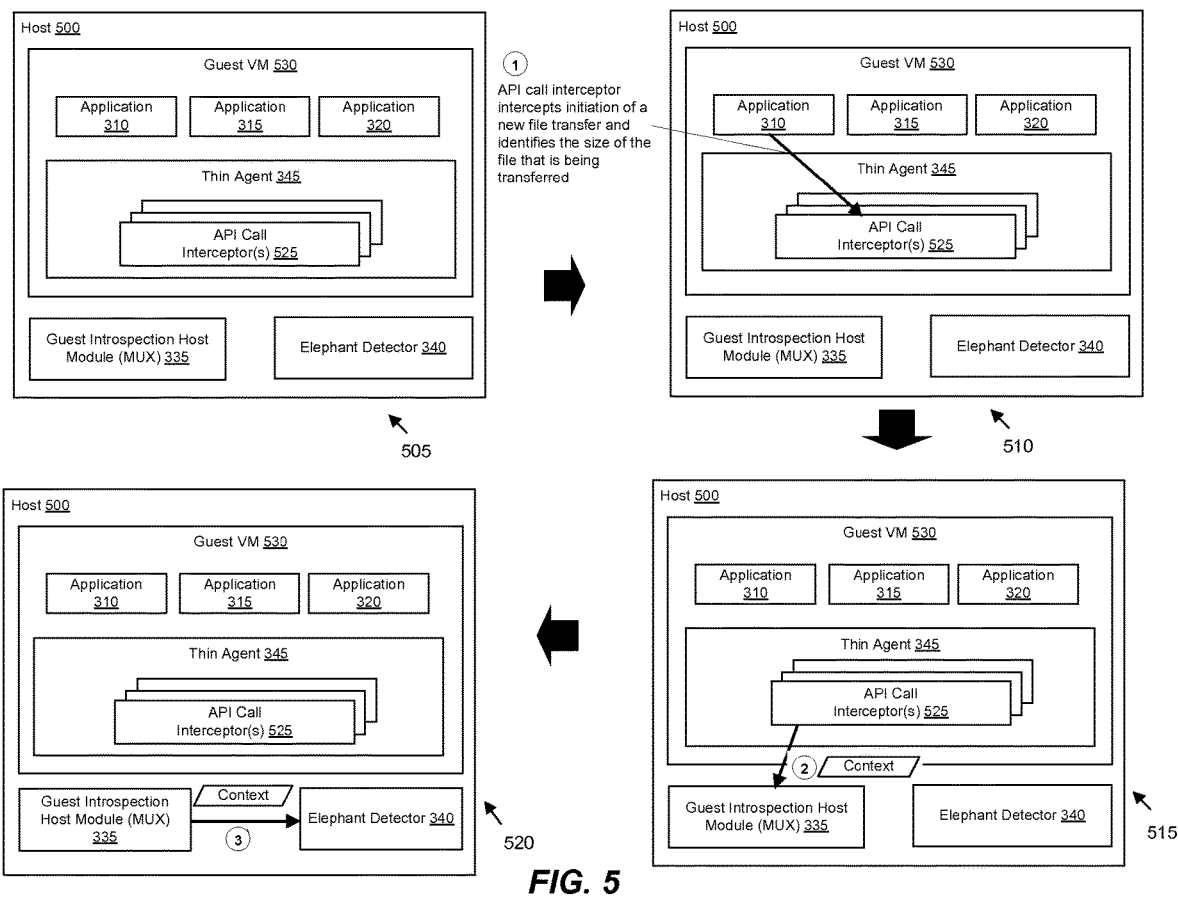
FIG. 5 illustrates an example of intercepting a high-level application call to detect an elephant flow.

FIG. 5 illustrates an example of intercepting a high-level application call to detect an elephant flow. Four operational stages 505-520 of the host 500 are shown in this figure. This figure is similar to FIG. 3, except that the control and data path interceptors 325 and 330 have been replaced by a set of API call interceptors 525.

The first stage 505 shows the VM 530 executing on the host 500. The thin agent 345 has been installed on the OS of the VM 530. The API call interceptor 525 is registered to intercept high-level application calls to send or receive data over a network. The thin agent 345 may have previously updated information regarding the user that is logged onto the OS. The user information is updated because that the thin agent 345 of some embodiments reports the information with each intercepted event.

The second stage 510 shows the thin agent 345 intercepting an API call made by the application 310. In particular, the API call interceptor 525 intercepts an API call to transmit a file on a socket. The API call interceptor 525 may identify the application 310 that initiated the call, user data, the type of connection (e.g., inbound or outbound), the address (e.g., MAC address, IP address) associated with the VM, the address associated with the destination machine, a port number, etc.

The second stage 510 also shows the thin agent 345 identifying the size of the data that is to be sent or received over the new connection. The third stage 515 illustrates the thin agent 345 sending data to the MUX 335 regarding the API call. The fourth stage 520 illustrates the MUX 335 sending the data to the elephant detector 340.

In the fourth stage 520, the elephant detector 340 receives the data from the MUX 335. Having received the data, the elephant detector 340 then analyzes the data to detect an elephant flow. In some embodiments, the elephant detector 340 receives the size of the data that is being transferred over the network connection with the API call. The elephant detector 340 may compare the size of the data to a threshold value. If the size exceeds the threshold value, the elephant detector 340 may specify that the data flow associated with the API call is an elephant flow. The elephant detector 340 may then report the elephant flow to agent or party that is interested in the report. For instance, in some embodiments, the elephant detector reports the elephant flow to a network controller, which in turn configures one or more forwarding elements to handle the elephant flow. Alternatively, the report may be sent directly to a forwarding element.

Figure 6:
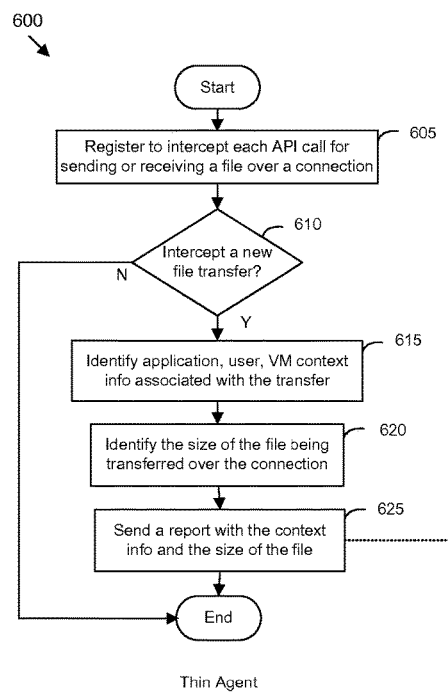
FIG. 6 illustrates a process that some embodiments implement to intercept a high-level application call to transmit a file on a socket.

In the example described above, the thin agent 345 intercepts an API call and the size of file that is to be downloaded to or uploaded from the machine. The thin agent 345 then provides the data to the MUX 335, which in turn provides the data to the elephant flow detector 340. FIG. 6 illustrates a process 600 that some embodiments implement to intercept a high-level application call to transmit a file on a socket. This is followed by FIG. 7, which illustrates a process 700 that some embodiments implement to analyze the data to detect an elephant flow. In some embodiments, the process 600 of FIG. 6 is performed by the thin agent 345, and the process 700 of FIG. 7 is performed by the elephant detector 340.

As shown in FIG. 6, the process 600 begins when it registers (at 605) to intercept API calls to send or receive a file one a socket. The process 600 then begins detecting (at 610) whether a new file transfer has been initiated (e.g., a new file is being sent or received). If a detection has been made, the process 600 identifies (at 615) the application, the user, VM context information associate with the connection. The process 600 then identifies (at 620) the size of the file that is being transferred with the call. The process 600 then reports (at 625) the context information and the size of the data (e.g., to the MUX). The process 600 then ends.

Figure 7:
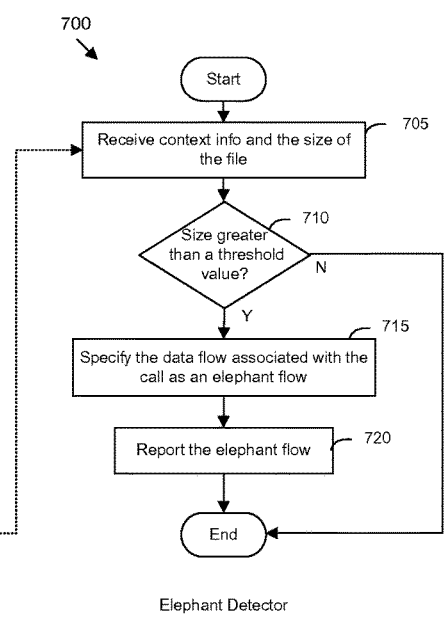
FIG. 7 a process that some embodiments implement to analyze context data relating to an application call to detect an elephant flow.

As shown in FIG. 7, the process 700 begins when it receives (at 705) the context info and the size of file. Here, the dashed arrow between the two processes 600 and 700 conceptually illustrate that the elephant agent might have received the data through an intermediary agent (e.g., the MUX). At 710, the process 700 determines whether the size of the file is greater than a threshold value. If so, the process 700 specifies (at 715) that the data flow associated with the API call is as an elephant flow.

At 720, the process 700 reports the elephant flow (e.g., to a forwarding element and/or a network controller). If the size of the file is not greater than a threshold value, the process 700 assumes that the data flow associated with the connection is a mouse flow and does not report it. The process 700 then ends. Some embodiments perform variations on the processes 600 and 700. The specific operations of the processes 600 and 700 may not be performed in the exact order shown and described. The specific operations may not be performed in one continuous series of operations, and different specific operations may be performed in different embodiments.

C. Combination of Machine Introspection and Packet Inspection

In some embodiments, the system detects an elephant flow using a combination of machine introspection and packet inspection. In detecting, the system may intercept a socket call that is being initiated by an application, or may intercept a high-level API call. In determining the amount of data being sent, the system of some embodiments specifies a unique identifier for the network connection. The system then marks outbound data (e.g., packets) with a marking (e.g., a unique marking) and keeps track of the amount of data sent using the marking. If the amount of data sent reaches a threshold value, the system then correlates the unique identifier of the outbound traffic with the context information. Thereafter, the system uses the context information to relay a message regarding the detected elephant flow (e.g., to an agent that is interested in the report).

Figure 8:
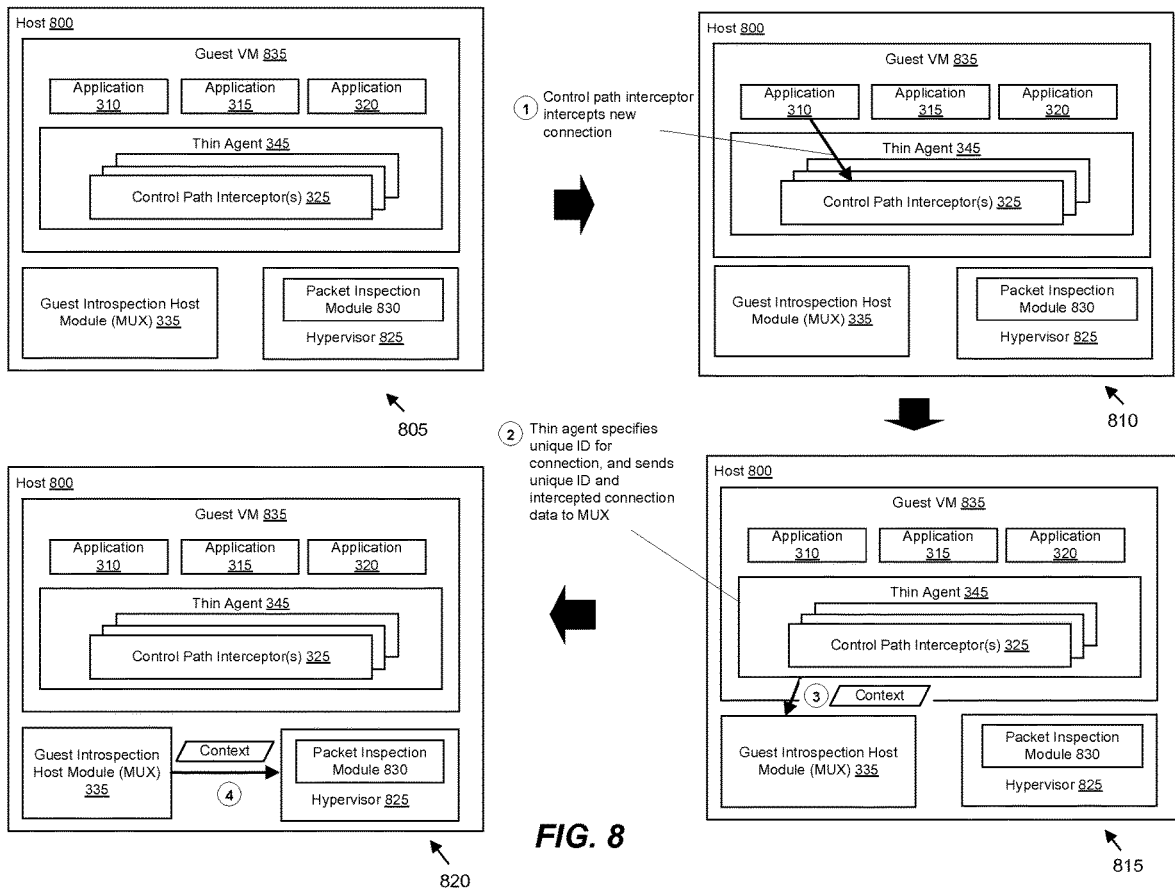
FIG. 8 illustrates an example of detecting an elephant flow using a combination of machine introspection and packet inspection.

FIG. 8 illustrates an example of detecting an elephant flow using a combination of machine introspection and packet inspection. In this example, the machine introspection is performed by the thin agent 345 executing on the VM 835. The packet inspection is performed by a hypervisor 825, namely the hypervisor's packet inspection module 830.

In this example, the hypervisor 825 is a bare metal hypervisor that runs on top of the hardware of the host machine 800 and runs below any operating system (OS). The hypervisor 825 handles various management tasks, such as memory management, processor scheduling, or any other operations for controlling the execution of the VM 835. Moreover, the hypervisor 825 can communicate with the VM 835 to achieve various operations (e.g., setting priorities). In some embodiments, the hypervisor 825 is one type of hypervisor (Xen, ESX, or KVM hypervisor) while, in other embodiments, the hypervisor 825 may be any other type of hypervisor for providing hardware virtualization of the hardware on the host 800.

To perform packet inspection, the hypervisor 825 includes the packet inspection module 830. For the purposes of elephant flow detection, the packet inspection module 830 is used to determine the amount of data sent over a particular connection. For instance, the packet inspection module of some embodiments keeps track of the number of packet sent (e.g., byte count and/or packet count) with a particular identifier (e.g., unique connection ID). In some embodiments, the packet inspection module uses packet header data to track the amount of data sent or received. For instance, the packet inspection module might identify the size of the payload of a packet from a header field. If the amount of data sent reaches a threshold value, the system then correlates the particular identifier with the context information associated with the connection. Thereafter, the hypervisor 825 uses the context information to report the elephant flow.

Having described example components of FIG. 8, example operations of these components will now be described by reference to the four stages 805-820 that are illustrated in the figure. The first stage 805 shows the VM 835 executing on the host 800. The thin agent 345 has been installed on the OS of the VM 835. The control path interceptor 325 is registered to intercept calls to create new network connections. The thin agent 345 may have previously updated information regarding the user that is logged onto the OS. The user information is updated because that the thin agent 345 of some embodiments reports the information with each intercepted event.

The second stage 810 shows the thin agent 345 intercepting a request made by the application 310 to open a new connection. In particular, the control path interceptor 325 intercepts a socket call and identifies information regarding the socket call. The control path interceptor 325 may identify the application 310 that initiated the call, user data, the type of connection (e.g., inbound or outbound), the address (e.g., MAC address, IP address) associated with the VM, the address associated with the destination machine, a port number, etc.

The third stage 815 illustrates the thin agent 345 sending data to the MUX 335 regarding the new connection. Prior to sending the data, the thin agent of some embodiments specifies an identifier (e.g., a unique identifier) for the connection. This unique identifier allows the packet inspection module 830 to keep track of the number of bytes sent and/or the number of packets sent thorough the connection.

The fourth stage 820 illustrates the MUX 335 sending the data to the hypervisor 825. Here, the MUX 335 provides the data asynchronously or synchronously to the hypervisor 825. In the fourth stage 820, the hypervisor 825 receives the data from the MUX 335. Having received the data, the packet inspection module then keeps track of the data sent through the connection. For example, the packet inspection module may store statistics relating to the packets with a particular marking. If the amount of data sent reaches a threshold value, the hypervisor 825 then correlates the particular marking with the context information associated with the connection. The hypervisor 825 then uses the context information to report the elephant flow. Here, the control path interceptor provides the context to the packet inspection module via the MUX. Also, each packet is stamped with an ID. This ID is then used to correlate the data being transferred with a connection (e.g., initiated by an application or user) and identify the elephant flow. In some embodiments, the hypervisor 825 reports the elephant flow to a network controller, which in turn configures one or more forwarding elements to handle the elephant flow. Alternatively, the report may be sent directly to a forwarding element.

Figure 9:
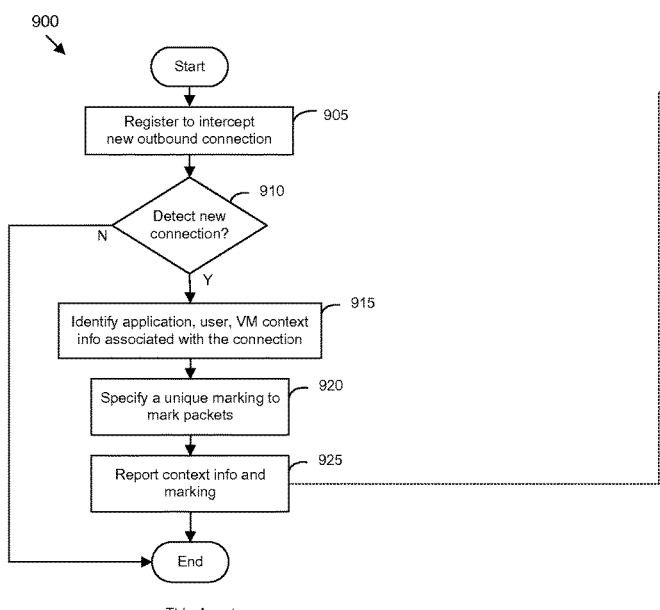
FIG. 9 illustrates a process that some embodiments implement to intercept a new connection and to specify a unique marking for packets sent over the connection.

In the example described above, the thin agent 345 intercepts the initiation of a new connection and the hypervisor identifies the amount of data that has been sent through the connection. FIG. 9 illustrates a process 900 that some embodiments implement to intercept a new connection and trap information regarding the connection. This is followed by FIG. 10, which illustrates a process 1000 that some embodiments implement to analyze the data to detect an elephant flow. In some embodiments, the process 900 of FIG. 9 is performed by the thin agent 345, and the process 1000 of FIG. 10 is performed by the hypervisor 825.

As shown in FIG. 9, the process 900 begins when it registers (at 905) to intercept the initiation of any new network connections (e.g., outbound network connections). The process 900 then begins detecting whether a new connection has been initiated. For instance, the process 900 of some embodiments detects (at 910) whether a socket call has been made to open a new connection. If a detection has been made, the process 900 identifies (at 915) the application, the user, and/or VM context information associate with the connection. The process then then defines or specifies (at 920) a unique marking to mark packets that are sent through the connection. The process 900 then reports (at 925) the context information and the marking. For instance, in the example described above, the control path interceptor provides the context to the packet inspection module via the MUX. Also, each packet is stamped with a marking. The process 900 then ends. In some embodiments, the process 900 returns to operation 920 when it detects another new connection.

Figure 10:
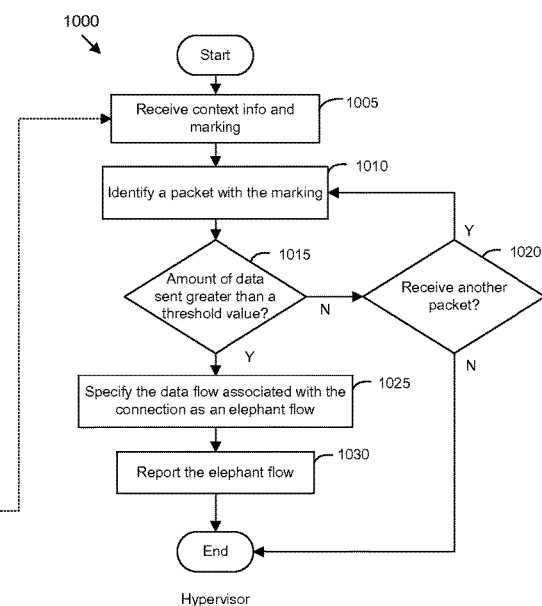
FIG. 10 illustrates a process that some embodiments implement to perform packet inspection in order to detect an elephant flow.

As shown in FIG. 10, the process 1000 begins when it receives (at 1005) the context info and the marking. Here, the dashed arrow between the two processes 900 and 1000 conceptually illustrate that the hypervisor might have received the data through an intermediary agent (e.g., the MUX).

At 1010, the process 1000 starts inspecting packets sent through the connection using the marking. The marking relates the packets to the connection. In particular, the process 1000 identifies (at 1010) a packet with the marking. Based on the identified packet, the process 1000 determines (at 1015) whether the amount of data sent is greater than a threshold value. If so, the process 1000 specifies (at 1025) that the data flow associated with the connection is as an elephant flow. That is, the marking is used to correlate the data being transferred with a connection (e.g., initiated by an application or user) and identify the elephant flow. The process 1000 then reports (at 1030) the elephant flow to an agent that is interested in the report. If the size of the data is not greater than a threshold value, the process 1000 proceeds to 1020, which is described below.

The process 1000 determines (at 1020) whether there is another packet being sent through the connection. If there is another packet, the process 1000 returns to 1010, which is described above. Otherwise, the process 1000 ends. Some embodiments perform variations on the processes 900 and 1000. The specific operations of the processes 900 and 1000 may not be performed in the exact order shown and described. The specific operations may not be performed in one continuous series of operations, and different specific operations may be performed in different embodiments.

For instance, in the example described above, the process 1000 inspects packet sent through a connection. In some embodiments, the process might perform similar operations for incoming packets. However, one or more of the detection rules are applied only based on the destination identity. This is because the process may only have the destination identity information and do not have the source identify information. As an example, the process might identify the destination IP address and destination port, and track the amount of data sent to the destination machine.

II. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
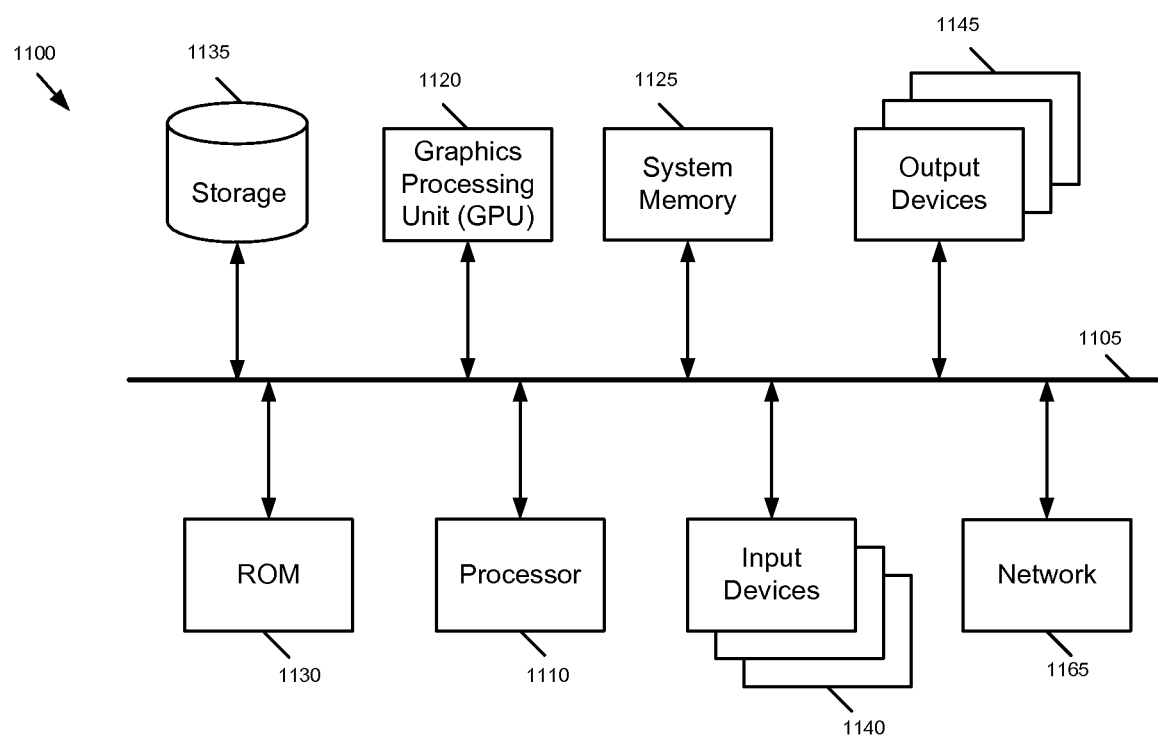
FIG. 11 conceptually illustrates an electronic system with which some embodiments of the invention are implemented.

FIG. 11 conceptually illustrates an electronic system 1100 with which some embodiments of the invention are implemented. The electronic system 1100 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1125, and the permanent storage device 1135.

From these various memory units, the processing unit(s) 1110 retrieves instructions to execute and data to process in order to execute the processes of the invention. The processing unit(s) may be a single processor or a multi-core processor in different embodiments.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash memory device, etc., and its corresponding drive) as the permanent storage device. Like the permanent storage device 1135, the system memory 1125 is a read-and-write memory device. However, unlike storage device 1135, the system memory 1125 is a volatile read-and-write memory, such a random access memory. The system memory 1125 stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alpha-numeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, it should be understood that the invention can be embodied in other specific forms without departing from the spirit of the invention. In addition, a number of the figures (including FIGS. 2, 4, 6, 7, 9, and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, it should be understood that the invention is not to be limited by the foregoing illustrative details, but rather is to be defined by the appended claims.

What is claimed is:

1. A method for detecting an elephant flow by inspecting operations of a machine that operates on a physical host computer, the method comprising:
   at a detector operating on the physical host computer, receiving information from an agent executing on the machine regarding a file transfer initiated by an application executing on the machine, the information comprising a size of the file to be transferred and a data flow associated with the file transfer;
   when the file size exceeds a threshold, specifying the data flow associated with the file transfer as an elephant flow; and
   reporting that the data flow is an elephant flow, wherein a managed forwarding element processes the data associated with the detected elephant flow differently from other flows not detected as elephant flows.

2. The method of claim 1, wherein the agent executing on the machine detects an application programming interface (API) call regarding the file transfer.

3. The method of claim 2, wherein the API call is associated with a particular data transfer protocol for transferring files between machines.

4. The method of claim 1, wherein the information received from the agent comprises at least one of (i) the application that initiated the file transfer, (ii) user data, and (iii) whether the file transfer is inbound or outbound.

5. The method of claim 1, wherein reporting that the data flow is an elephant flow comprises reporting the data flow to a network controller.

6. The method of claim 1, wherein the network controller configures the managed forwarding element to process the data associated with the elephant flow differently.

7. The method of claim 1, wherein the detector receives the information from the agent via a multiplexer module.

8. A non-transitory machine-readable medium storing a detector program that when executed by at least one processing unit of a physical host computer detects an elephant flow by inspecting operations of a machine that operates on the physical host computer, the program comprising sets of instructions for:
   receiving information from an agent executing on the machine regarding a file transfer initiated by an application executing on the machine, the information comprising a size of the file to be transferred and a data flow associated with the file transfer;
   when the file size exceeds a threshold, specifying the data flow associated with the file transfer as an elephant flow; and
   reporting that the data flow is an elephant flow, wherein a managed forwarding element processes the data associated with the detected elephant flow differently from other flows not detected as elephant flows.

9. The non-transitory machine-readable medium of claim 8, wherein the agent executing on the machine detects an application programming interface (API) call regarding the file transfer.

10. The non-transitory machine-readable medium of claim 8, wherein the API call is associated with a particular data transfer protocol for transferring files between machines.

11. The non-transitory machine-readable medium of claim 8, wherein the information received from the agent comprises at least one of (i) the application that initiated the file transfer, (ii) user data, and (iii) whether the file transfer is inbound or outbound.

12. The non-transitory machine-readable medium of claim 8, wherein the set of instructions for reporting that the data flow is an elephant flow comprises a set of instructions for reporting the data flow to a network controller.

13. A method of inspecting operations of a machine to detect an elephant flow, the method comprising:
   at the machine, detecting an initiation of a new data flow to transfer data;
   tracking an amount of data being transferred in the data flow;

determining, based on the amount of data transferred, whether the data flow is an elephant flow; and if the determination is made that the data flow is an elephant flow, specifying the data flow as elephant flow and identifying one or more pieces of information associated with the elephant flow in order to process the data associated with detected elephant flow different from other non-detected flows.

14. The method of claim 13, wherein the machine is a virtual machine (VM) or a physical machine.

15. The method of claim 13, wherein the detecting comprises intercepting a network connection that is being opened on the machine.

16. The method of claim 15, wherein the detecting further comprises intercepting a socket call that is made to open the network connection.

17. The method of claim 13, wherein the determining comprises (i) comparing the amount of data transferred with a threshold value and (ii) specifying, if the amount of data being transferred is greater than a threshold value, that the data flow is an elephant flow.

18. The method of claim 13 further comprising sending a message regarding a detected elephant flow to an agent, wherein the agent receives the message and processes each packets in the detected elephant flow different from other non-detected flows.

19. The method of claim 18, wherein the machine is a source machine, wherein the context information includes at least one of the name of the source machine, an address associated with the source machine, an address associated with the destination machine, a port number, an identification of an application that initiated the new data flow, and user data.

* * * * *